(12) United States Patent
Duhaney (10) Patent No.: US 12,274,677 B1
(45) Date of Patent: Apr. 15, 2025

(54) SMART BOTTLE FOR FEEDING BABIES AND TODDLERS

(71) Applicant: Ghenet Duhaney, Coral Springs, FL (US)

(72) Inventor: Ghenet Duhaney, Coral Springs, FL (US)

(*) Notice: Subject to any disclaimer, the term of this patent is extended or adjusted under 35 U.S.C. 154(b) by 806 days.

(21) Appl. No.: 16/985,675

(22) Filed: Aug. 5, 2020

(51) Int. Cl.
| | |
|---|---|
| *A61J 9/00* | (2006.01) |
| *A61J 9/04* | (2006.01) |
| *A61J 11/00* | (2006.01) |
| *G01L 5/00* | (2006.01) |
| *G06F 3/16* | (2006.01) |
| *G08B 7/06* | (2006.01) |
| *G10L 25/51* | (2013.01) |
| *H04R 1/02* | (2006.01) |
| *H04R 1/08* | (2006.01) |

(52) U.S. Cl.
CPC ............. *A61J 9/003* (2013.01); *A61J 9/04* (2013.01); *A61J 11/008* (2013.01); *G06F 3/165* (2013.01); *G10L 25/51* (2013.01); *H04R 1/028* (2013.01); *H04R 1/08* (2013.01); *A61J 2200/70* (2013.01); *G01L 5/00* (2013.01); *G08B 7/06* (2013.01)

(58) Field of Classification Search
CPC ... A61J 9/00; A61J 9/003; A61J 11/008; A61J 9/02
See application file for complete search history.

(56) References Cited

U.S. PATENT DOCUMENTS

| | | | |
|---|---|---|---|
| 2018/0211558 A1* | 7/2018 | Lau | A61J 9/04 |
| 2019/0096224 A1* | 3/2019 | Shoham | G08B 21/182 |
| 2019/0125630 A1* | 5/2019 | Van Kollenburg | A61J 9/06 |
| 2020/0196782 A1* | 6/2020 | Lee | A47G 19/2227 |

* cited by examiner

*Primary Examiner* — Jeffrey R Allen
(74) *Attorney, Agent, or Firm* — ALLEN, DYER, DOPPELT & GILCHRIST, P.A.

(57) ABSTRACT

A smart baby bottle is disclosed. A smart bottle comprises a hollow body for holding fluid, a bottle cap attached to the top of the hollow body, and a bottle base mounted on the hollow body. The bottle cap comprises a nipple or is optionally attached to a nipple. The bottle base comprises an electronic function system. In an aspect, the electronic function system comprises a battery, a circuit board, a switch button, a music interchanger system, and an audio system. The electronic function system can provide and/or trigger a sound pattern when a baby or toddler is drinking from the smart bottle. The bottle base can be separated from the hollow body when desired. The smart bottle may be configured to be located remotely.

7 Claims, 10 Drawing Sheets

SMART BOTTLE FOR FEEDING BABIES AND TODDLERS

FIELD OF INVENTION

The present invention relates to devices and methods for facilitating baby feeding and locating products.

BACKGROUND

Many products capable of playing music have been developed for babies. Examples of these products range from activity centers to mobiles. Motivating a baby to eat or drink can be difficult. There is therefore a need to develop a device that can facilitate baby feeding. This device can combine a sound function and a feeding function. In addition, a baby product can be misplaced or lost easily. Consequently, there is a need to combine a remote locator function with a baby product or any other product that needs a remote locator function. A further benefit would be realized in the industry by providing a smart feeding bottle that could not only motivate a baby or toddler to eat or drink, but that could also implement a learning scheme for the baby or toddler.

SUMMARY

In view of the foregoing, an object of the present invention is to provide an improved baby feeding product and related methods. A smart bottle is disclosed as an embodiment of the present invention. A smart bottle can comprise a hollow body for holding fluid, a bottle cap attached to the top of the hollow body, and a bottle base mounted on the hollow body. The bottle cap can comprise a nipple or optionally the bottle cap can be attached to a nipple. The bottle base can comprise an electronic function system. The electronic function system can provide pre-recorded music or activate a remote music system. In an aspect, the bottle base can be separated (e.g., screwed off, detached) from the hollow body. In another aspect, the electronic function system can enable the smart bottle to be located from a remote location, for example, by a location sensor, a sound sensor, and the like.

In another embodiment, a smart pacifier is disclosed. The smart pacifier can comprise a nipple and an electronic function system mounted to the nipple. The electronic function system can be affixed to the inside or the outside of the nipple. The electronic function system can be separated (e.g., screwed off, detached, etc.) from the smart pacifier when desired. When a baby is sucking on the smart pacifier, a pressure sensor mounted on the nipple can transmit a signal to the audio system, triggering the audio system to select and/or play one or more pre-recorded melodies. The pre-recorded melody or melodies may be played to stimulate the baby to eat. Alternatively, upon receiving a signal from the pressure sensor, the audio system can trigger a remote music system to play music. In another aspect, the smart pacifier can be located from a remote location, for example, by a location sensor, a sound sensor, and the like. The music or other media content played via the smart bottle, the smart pacifier or a remote media content system can provide benefit for potential mental development or education (e.g., music education) for a user (e.g., a baby).

In another embodiment, a smart attachment is disclosed. The smart attachment can be mounted on any product for the purpose of identifying location. As an example, the smart attachment can comprise a functional base (e.g., an elastic band) connected to an attachment means. The functional base can comprise a circuit board, a battery, and one or more speakers, wherein components of the functional base are operably interconnected. The battery can be configured to provide power to the circuit board and the one or more speakers. The circuit board can be configured to detect particular sound patterns (e.g., clap sound) and set off an alarm to facilitate locating the smart attachment. The attachment means can enable attachment of the functional base to the body and/or surface of a product (e.g., a bottle, a cup, etc.). For example, the attachment means can comprise a magnet, a hook, a patch of tape, or any other adhesive and/or attachment means. In an aspect, the smart attachment can also comprise a remote control. The remote control can be configured to trigger an alarm in the smart attachment when the smart attachment is lost and/or out of sight. The remote control can comprise a battery, a trigger button, a compass, and one or more LED lights. When a user presses the trigger button on the remote control, the compass can direct the user toward certain direction to locate the smart attachment.

These and other objects, aspects and advantages of the present invention will be better appreciated in view of the drawings and following detailed description of a preferred embodiment.

DETAILED DESCRIPTION

Referring to FIGS. 1-10, according to an embodiment of the present invention, smart bottle 10 can comprise hollow body 12 for holding fluid, bottle cap 14 attached to the top of hollow body 12, and bottle base 16 mounted on hollow body 12. Bottle cap 14 can comprise nipple 18. In an aspect, bottle base 16 can be separated (e.g., screwed off, detached) from hollow body 12. Bottle base 16 can comprise electronic function system 20. In an aspect, electronic function system 20 can comprise battery 22, circuit board 24, switch button 26, sound interchanger system 28, and audio system 30, wherein components of the electronic function system 20 are operably interconnected. In an aspect, battery 22 can provide power to circuit board 24, sound interchanger system 28, and audio system 30. Switch button 26 can be configured to switch on or off of electronic function system 20 of smart bottle 10.

Figure 10:
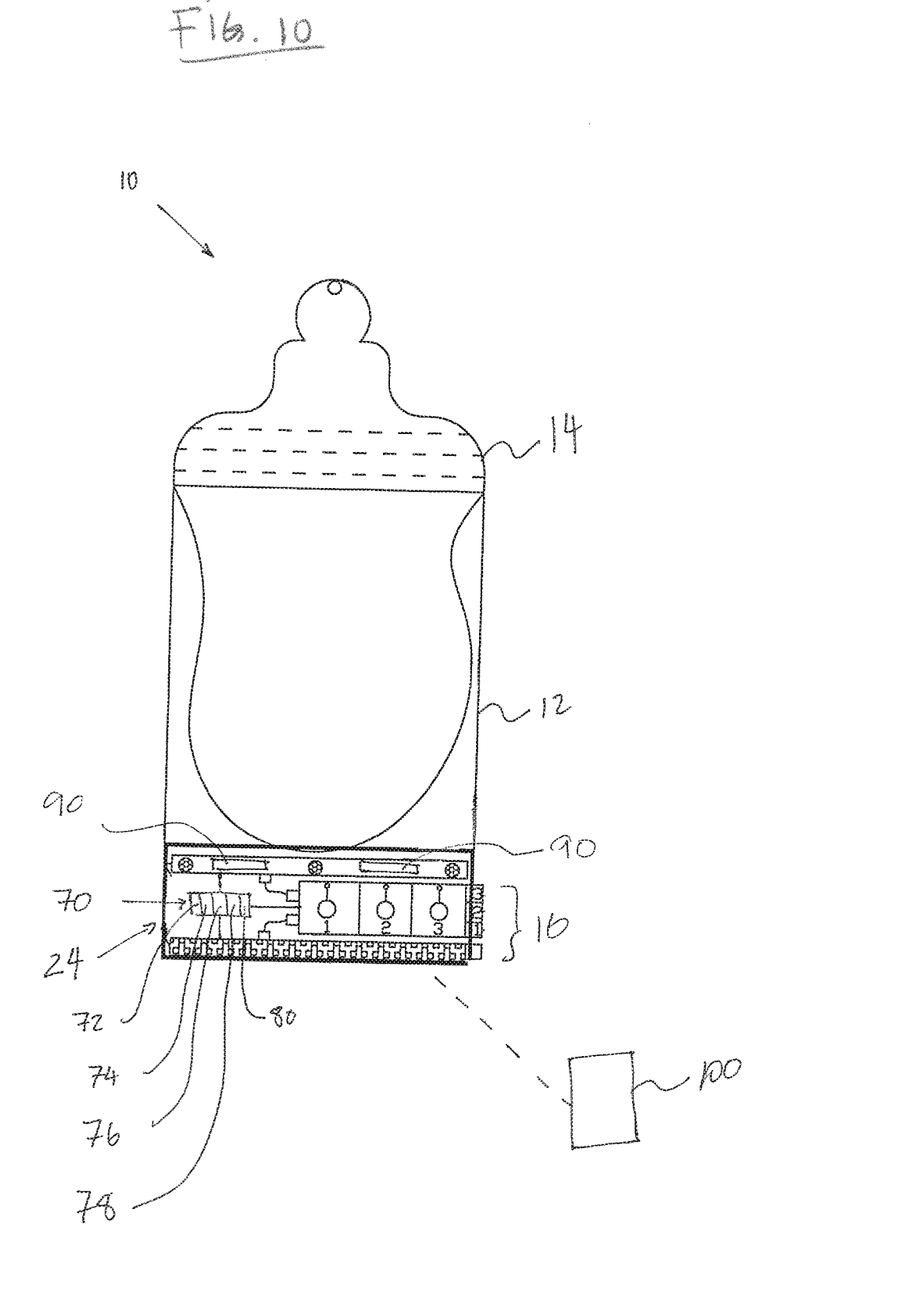
FIG. 10 is a front vie of an even further illustrative embodiment of a smart bottle according of the present invention.

The circuit board 24 may comprise a sensor assembly 70, which is indicated at least in FIG. 10. The sensor assembly 70 may comprise one or more sensors (e.g., a pressure sensor 72, a motion sensor 74, a location sensor 76, a sound sensor 78, etc.). A motion sensor 74 may be configured and/or used to determine a position of at least one of the components of the smart bottle 10, which may include at least a position of the hollow body 12, but may also include a position of the cap 14 and/or base 16. That is, the circuit board 24 may comprise a motion sensor 74 configured to determine positions (e.g., upright position, tilted position, etc.) and/or movement or otherwise displacement (e.g., certain motion pattern) of smart bottle 10. The position and/or the motion sensor 74 can determine whether a user (e.g., a baby) is drinking from smart bottle 10. For example, when the position and/or motion sensor 74 determines that smart bottle 10 alternates between an upright position and a tilted position, music can be provided to the user (e.g., a baby). The location sensor 76 may be operatively configured with an external device to determine the location of at least one of the components of the smart bottle 10. In at least one embodiment, the location sensor 76 may be operatively configured with an external device to determine the location of at least the hollow body 12.

In an aspect, sound interchanger system 28 can select and/or provide a sound pattern, e.g., a music or other sound pattern, via audio system 30 while a user (e.g., baby) is drinking from smart bottle 10. In another aspect, sound interchanger system 28 can be configured to trigger a remote music system (e.g., radio, television, smart phone, tablet, home entertaining system, vehicle entertaining system, etc.) when a user is drinking from smart bottle 10. The circuit board 24 may be operatively connected to a sound interchanger system and an audio system. In this scenario, circuit board 24 can be configured to communicate with one or more remote music systems (e.g., radio, television, smart phone, tablet, home entertaining system, vehicle entertaining system, etc.) via wireless communications such as Wi-Fi, Bluetooth or any desired method or standard. Smart bottle 10 can operate as a music therapist for a baby. Smart bottle 10 can also motivate a baby to eat or drink.

Figure 3:
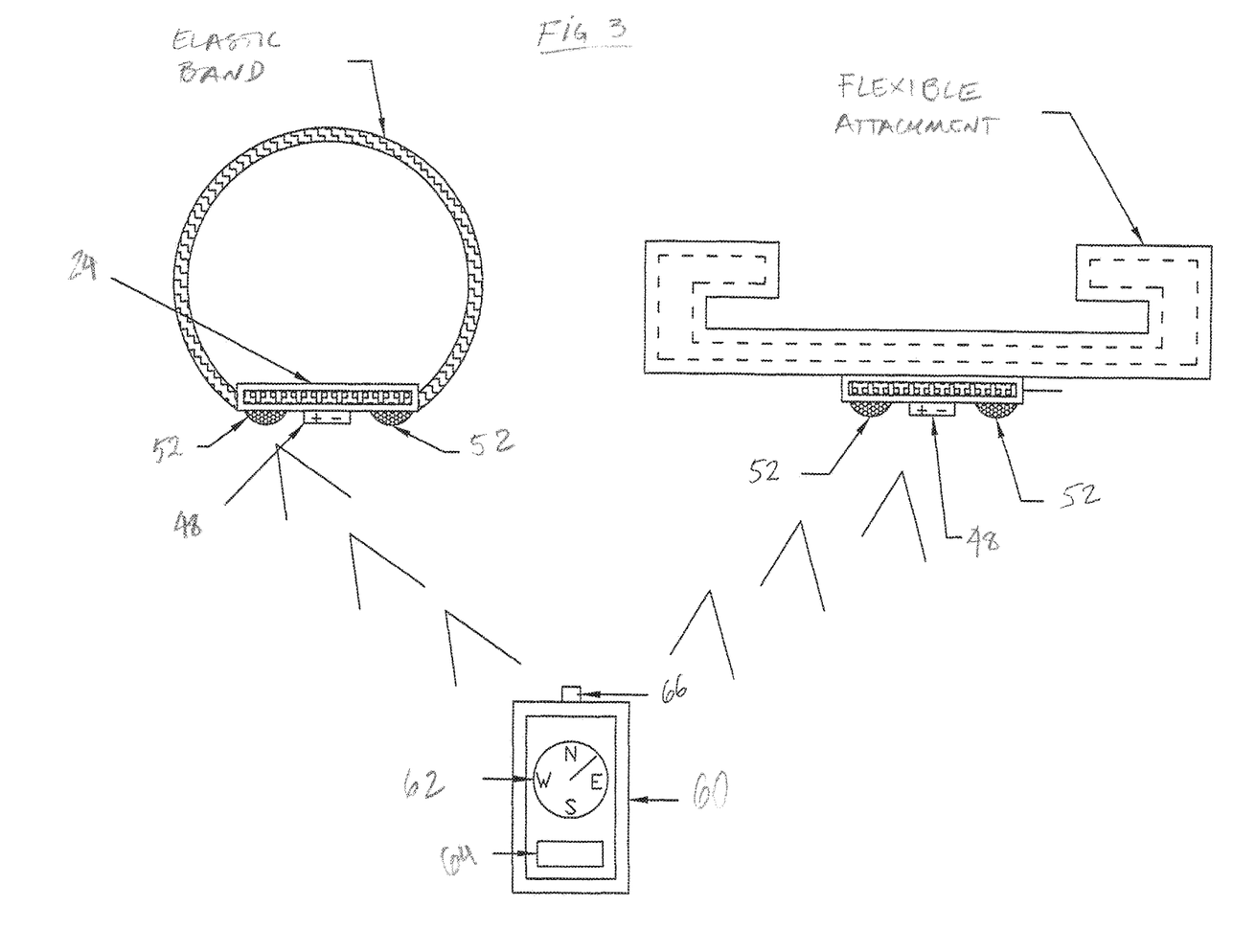
FIG. 3 is front view of illustrative embodiments of two different attachments of the smart bottle according to the present invention.

As shown in FIG. 3, a smart bottle 10 may be provided with two different attachments that can be used to attach to other items, including, but not necessarily limited to other items that are susceptible to misplacement or being lost. The attachments may comprise an elastic band and/or a flexible attachment. A remote control 60 may optionally be provided to trigger an alarm of the attachments in case of misplacement or if they are lost or otherwise out of range. The elastic band and flexible attachment may be provided with a circuit board, battery 48 and/or speakers 52. The battery 48 may be configured to provide power to the circuit board and/or speakers 52. The circuit board 24 may be configured to detect a sound or other signals, e.g., a clapping sound, at which point a set off an alarm may be triggered to assist an individual find the attachments. The remote control 60 may be battery operated and may comprise a trigger button 66, compass 62, and/or remote light 64. The remote light 64 may comprise an LED light. Once the trigger button 66 is pressed, the compass 62 may indicate to the person where to go to find the attachments. The compass 62 may be configured to send a signal to the circuit board, and may a predetermined range, which may comprise up to a mile. Once the attachments are in close proximity the circuit board may be configured to emit a lighting pattern, including flashing lighting pattern, to notify the individual that the attachments are within proximity.

With reference to FIG. 10, the sensor assembly 70 may comprise a sound sensor 78 configured to ascertain an external sound pattern. The location sensor 78 may facilitate a user to locate the smart bottle 10. For example, the location sensor 78 can be configured to identify certain sound pattern (e.g., a clap sound and/or a clapping sound pattern) and trigger an alarm sound or other predetermined sound pattern (e.g., a music melody) through music function system 20. As a further example, the location sensor 78 may be operatively configured with the sound interchanger system 28 and an audio system 30 to trigger the alarm or other predetermined sound pattern. In at least one embodiment, the audio system 30 is operatively configured with the sound interchanger system 28 and the sensor assembly 70 to trigger a predetermined sound pattern upon the occurrence of a predetermined condition. The predetermined condition may comprise a distance of displacement of the components of the smart bottle 10, including the hollow body 12, which exceeds a threshold distance. Such threshold distance may comprise a distance of displacement from an initial location that exceeds a anywhere from few inches to a few feet, or more. The predetermined condition may also comprise a change in the position of the smart bottle 10, including the hollow body 12. Such a change in position may be ascertained by a motion sensor 74. For example, the predetermined condition may comprise a change in the position of the hollow body 12 from a substantially upright position (i.e., before the baby or infant starts drinking form the smart bottle 10), to a substantially tilted or inclined position (i.e., indicative that the baby or infant has started drinking from the smart bottle 10). As used herein the terms "baby", "infant" and/or "toddler" include the plural as well as the singular, and include young children from newborns to those that are older but that may still feed from a baby bottle.

Figure 1:
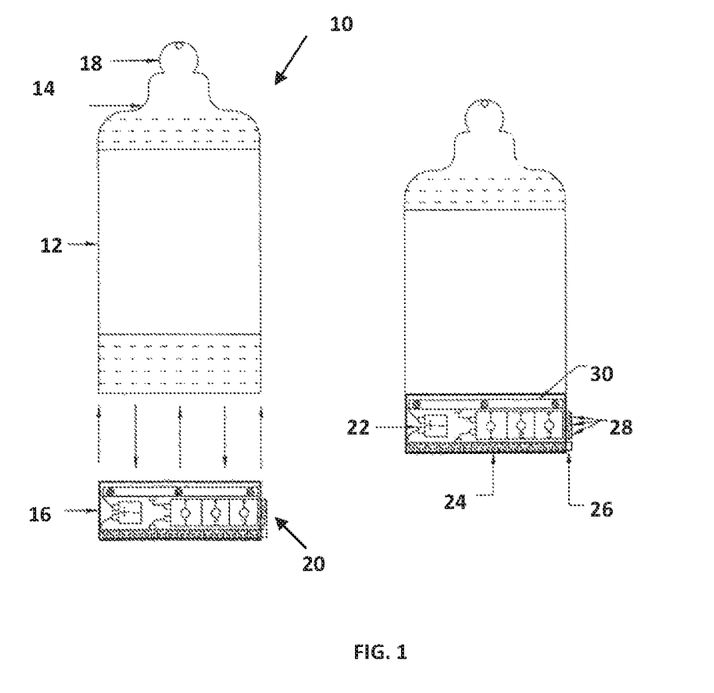
FIG. 1 is front view an illustrative embodiment of the smart bottle according to the present invention.
Figure 2:
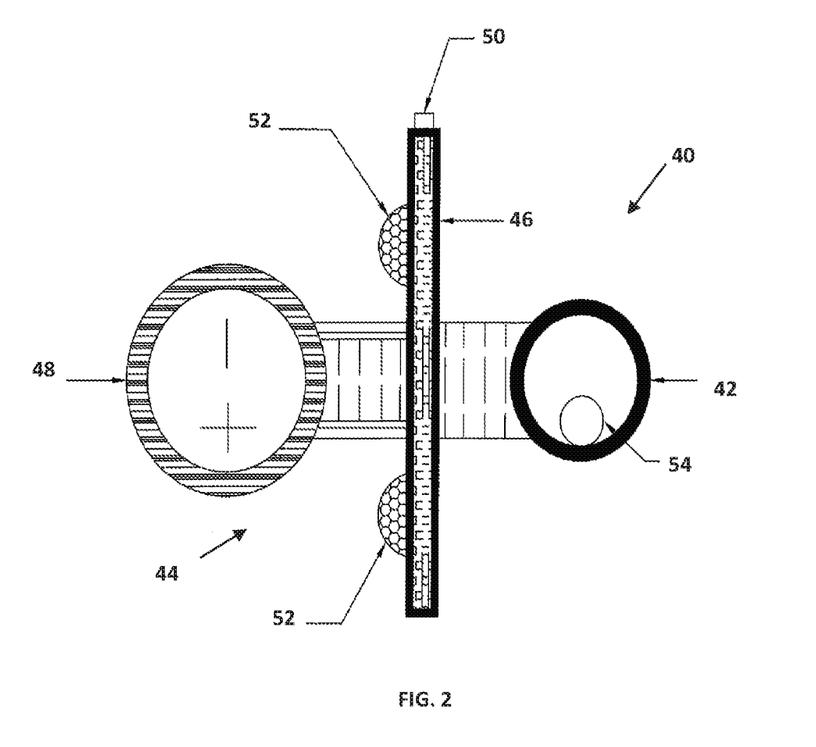
FIG. 2 is a front perspective view an illustrative embodiment of a smart pacifier according to the smart bottle of the present invention.

Referring to FIG. 2, smart pacifier 40 can comprise nipple 42 and electronic function system 44 mounted to nipple 42. Electronic function system 44 can comprise circuit board 46, battery 48, switch button 50, and one or more speakers 52, wherein components of the electronic function system 44 are operably interconnected. The electronic function system 44 can be separated (e.g., screwed off, detached) from nipple 42 when desired. Battery 48 can provide power to circuit board 46 and one or more speakers 52. Switch button 50 can be configured to turn on or off the electronic function of smart pacifier 40.

In an aspect, when a baby is sucking on smart pacifier 40, the pressure sensor 72 and/or 54 in circuit board 46 can detect a pressure change pattern (e.g., high and low pressure alternation) and transmit a signal to circuit board 46. In at least one embodiment, the predetermined condition comprises the pressure sensor 72 and/or 54 triggering a predetermined sound pattern upon a change in pressure of the nipple 42 over a threshold pressure. Such a threshold pressure may comprise a pressure sufficient for the nutritional substance inside the smart bottle 10 to exit out of the nipple 42. For example, circuit board 46 can select and/or play one or more pre-recorded music melodies for the baby, or alternative an alarm. Alternatively, circuit board 46 can be configured to trigger one or more remote music systems (e.g., radio, television, smart phone, tablet, home entertaining system, vehicle entertaining system, etc.) upon a sufficient change in the pressure of the nipple 42. In this scenario, circuit board 46 can be configured to communicate with the one or more remote music systems via wireless communications such as Wi-Fi, blue tooth, and other desired standards. Smart pacifier 40 can operate as a music therapist for a baby. Smart pacifier 40 can also motivate a baby to suck.

In another aspect, circuit board 46 can comprise a sound sensor 78. The sound sensor 78 can be configured to identify certain sound patterns (e.g., a clap sound) and trigger an alarm sound or other predetermined sound (e.g., a music melody) to facilitate a user to locate smart pacifier 40. The circuit board 46 can comprise a location sensor 76, wherein the location sensor 76 can facilitate a user to locate the smart pacifier 40.

With reference to at least FIG. 3, a smart attachment can be mounted on the smart botte 10, or components thereof, to facilitate identifying its location. The smart attachments can comprise functional base (e.g., elastic band, a block, etc.) connected to an attachment means. Functional base can comprise circuit board, battery, and one or more speakers, wherein components of functional base are operably interconnected. Battery can be configured to provide power to circuit board and one or more speakers. Circuit board can be configured to detect particular sound patterns (e.g., clap sound) and set off an alarm or a pre-recorded music sound. The attachment means can be means to attach the functional base to the body and/or surface of a product (e.g., a bottle, a cup, etc.). For example, attachment means can comprise a magnet, a hook, a patch of tape, or any other adhesive and/or attachment means.

With reference to FIG. 3, the smart bottle may 10 be provided with a remote control 60. For example, the smart attachment may comprise a remote control 60. When smart attachment is lost and/or out of sight, a user can press on remote control 60 to trigger an alarm sound of smart attachment. Remote control 60 can comprise battery, trigger button, compass, and one or more LED lights. Components of the remote control 60 are operably interconnected. Once trigger button is pressed, circuit board can receive a first signal from remote control 60. Circuit board can, in turn, transmit a second signal to remote control 60, causing compass to point toward the direction that smart attachment is located. Remote control 60 can communicate with smart attachment via Bluetooth, infrared, ultrasound or any other appropriated communication means. In an aspect, remote control 60 can transmit signals to smart attachment up to a predefined range (e.g., five hundred meters). In another aspect, once smart attachment is in close proximity of remote control 60, one or more LED lights can be turned on to notify the user that smart attachment is within certain range (e.g., five meters). In an alternative embodiment, the electronic function system 24 may be operatively connected to a remote control 60. In such alternative embodiment, the remote control 60 may be configured to selectively trigger a predetermined sound pattern. Such a predetermined sound pattern may comprise a melody or an alarm.

Figure 4A:
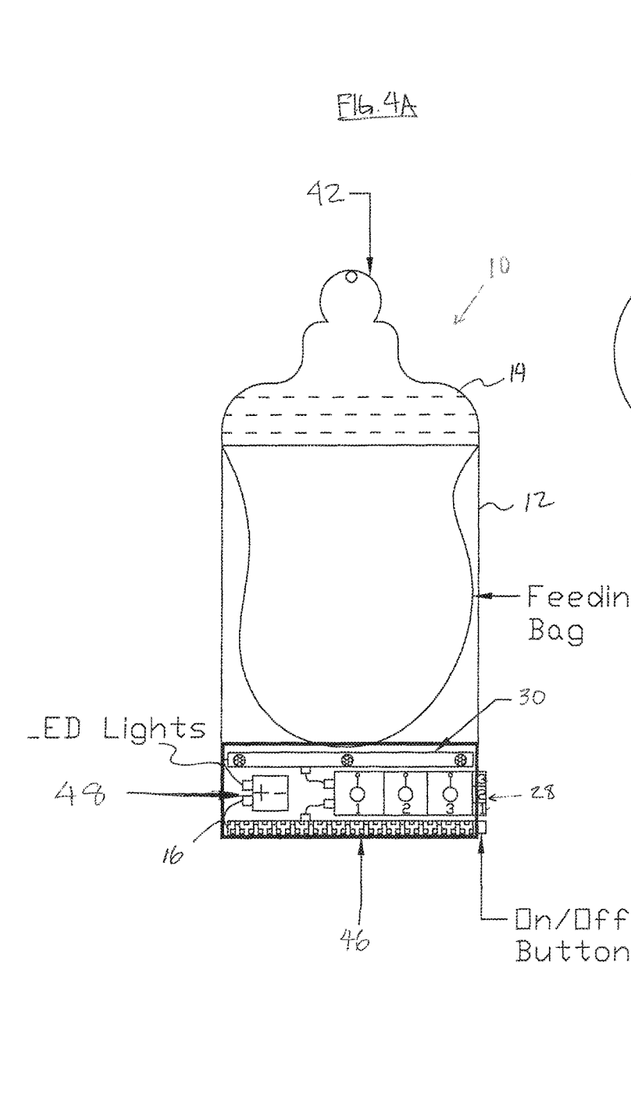
FIG. 4A is a front perspective view of another illustrative embodiment of the smart bottle according to the present invention.
Figures 4B, 4C:
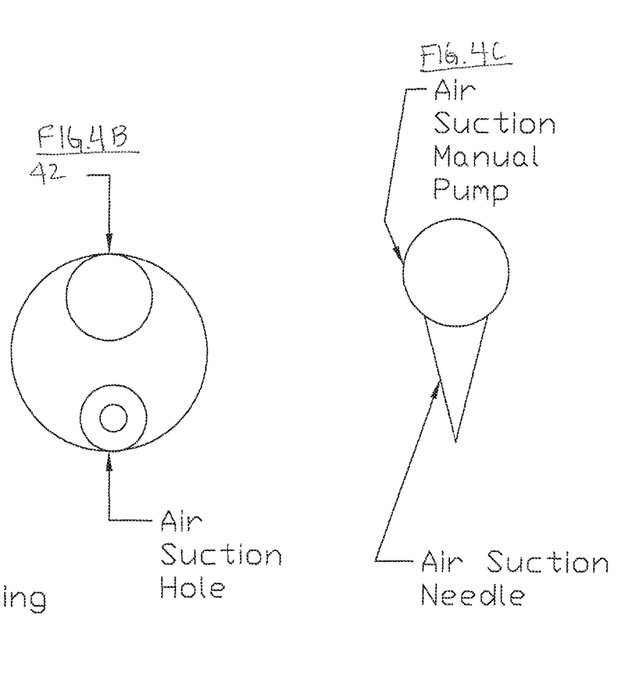
FIG. 4B is a top view of an illustrative embodiment of a cap with a nipple of the smart bottle according to the present invention.
FIG. 4C is a top view of an illustrative embodiment of an air suction apparatus comprising an air suction needle of the smart bottle according to the present invention.

FIGS. 4A-4C are representative of various embodiments of the present invention that illustrate certain hygienic features. It is within the scope of the present invention to at least partially lower airflow into and out of the bottle, such that the baby or infant will not be exposed to unnecessary air while drinking the nutritional substance. Excessive air can cause gas, bloating, and buildup of bacteria. As shown in FIG. 4A, the smart bottle 10 may be provided with a feeding bag to contain the fluids and to facilitate containing retained gaseous fluids, including air, within the smart bottle 10. As shown in FIG. 4A, the smart bottle 10 may be provided with a cap 14 comprising a nipple 42 so the baby or infant may drink the nutritional substance. Additionally, the smart botte 10 may also be provided with a suction hole that will allow a gaseous substance, i.e., air, to escape from the smart bottle 10 as may be necessary. FIG. 4B, which shows the cap 14 with the nipple 42 and the air suction hole. The air suction hole may comprise a lid that can open and close as needed. FIG. 4C shows a an air suction apparatus comprising an air suction needle that enters through the air suction hole and allows for a fluid communication between the outside and inside of the smart bottle 10. The air suction apparatus may comprise an air suction pump, which may be manually operated. The pump is intended to dispense entrapped air through a small hole located thereon.

Figure 5:
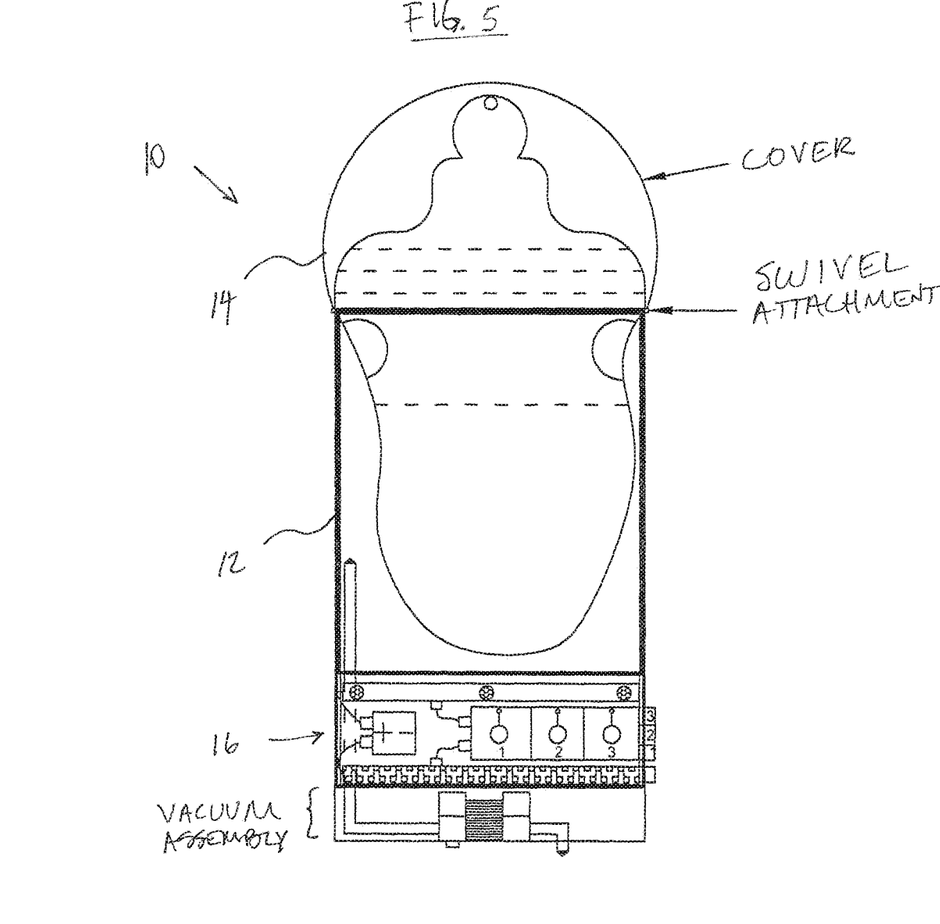
FIG. 5 is a front view of even another illustrative embodiment of the smart bottle according to the present invention.

With reference now to at least FIG. 5, various embodiments of the smart bottle 10 according to the present invention comprise vacuum capabilities. Bottles may generally collect air inside and as such, are exposed to the elements in the atmosphere. To decrease entrapped air, the smart bottle 10 may be provided with a vacuum located at the bottom of the smart bottle 10. The vacuum may be turned on and off with a button, and should be able to provide for adequate means for the entrapped air to exit the smart bottle 10, i.e., the exit the hollow body 12. This may be enabled, for example as is shown at least in FIG. 9, through an interior needle adjacently disposed to the vacuum on an interior of the smart bottle 10. As is further shown at least in FIG. 9, the bag linier may comprise an opening that will enable a fluid communication between the outside and the inside of the smart bottle 10, which will also at least partially allow entrapped air to exit. When the air exits and/or enters, it is contemplated the bag will respectively exhale and/or inhale serving as an indicator of the amount of entrapped air remaining inside the smart bottle 10. The vacuum may also comprise an exterior needle that comes out of the bottom of the smart bottle 10 to extract the entrapped air. As shown at least in FIG. 9, the vacuum may further comprise a cooling fan that can function at least partially lower the temperature of the vacuum and may further help to remove any excess air located in the bottle, for example, via the exterior needle. The smart bottle 10 may also be provided with a plastic material that will act as an insulation sheet or layer maintaining the temperature of the nutritional substance, for example at a warm temperature.

Figure 6:
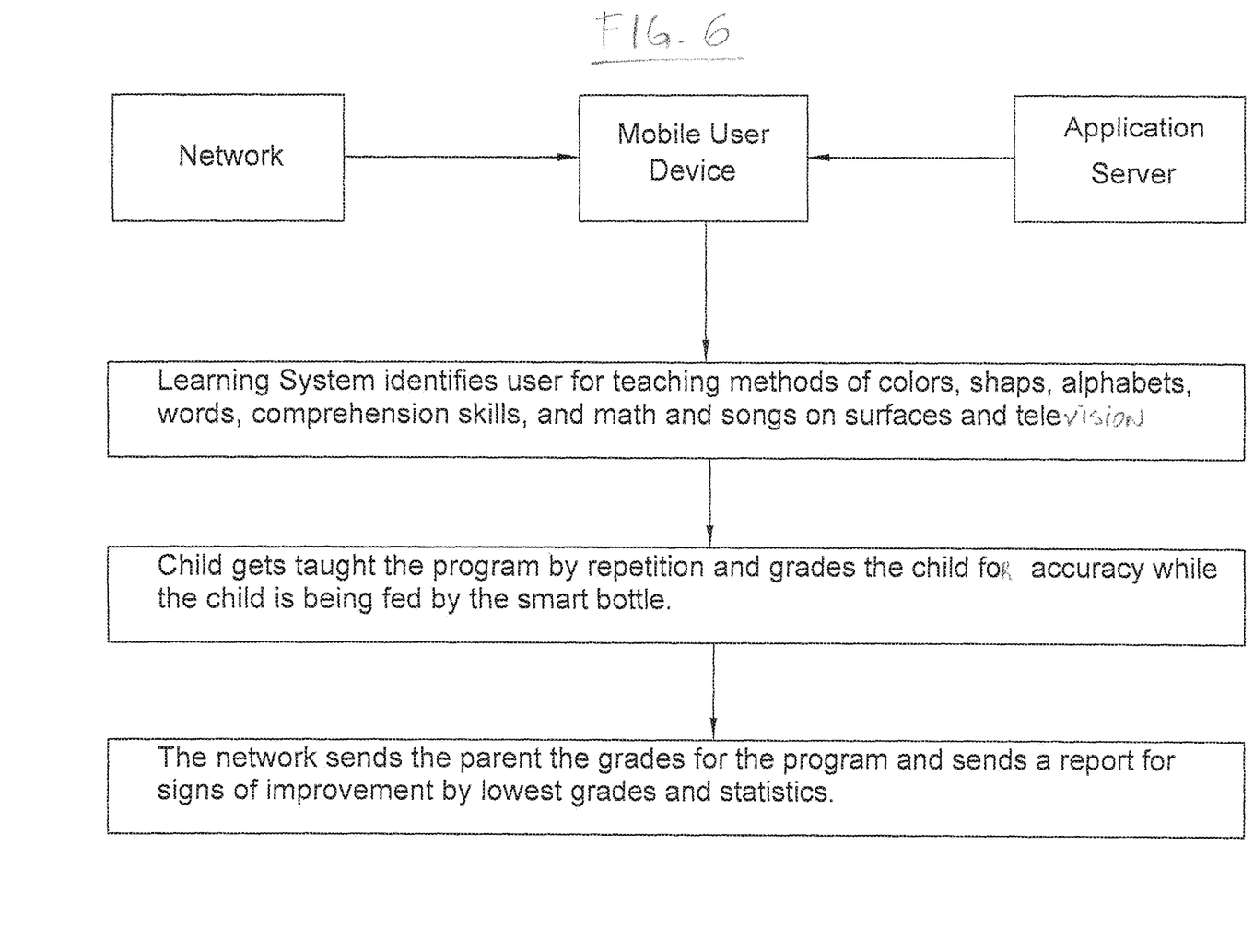
FIG. 6 is a schematic representation of an illustrative embodiment of a system according to the present invention.

With reference to FIG. 6, another aspect of the present invention comprises a system configured to use the smart bottle 10 as a learning tool for the baby or infant. The system according to the present invention comprises a smart bottle 10 operatively configured with a network that communicates with an external device, e.g., a mobile device, and/or an application server. An electronic platform, i.e., a mobile application and/or web browser application, may allow a user to login via authenticated credentials to setup various learning modules or schemes, i.e., methods for teaching the child colors, shapes, alphabets, words, comprehension skills, mathematical problems, songs, and other instructional content that, as will be explain in more detail, may be reproduced visually or audibly, including on a surface or a screen using the electronic platform. The next step would be for the child to be taught by repetition, and once the child completes a learning module, the system should have the ability to grade the child for accuracy while the child is being fed by the smart bottle 10. The last step involves sending the parent or legal guardian of the child the grades or progress of the child, including through the network and/or application server and/or external device, i.e., tablet, laptop, desktop, mobile telephone, etc. The application should be configured to analyze performance statistics to identify areas of progress of the child and/or areas of improvement, for example areas where the child's performance was not satisfactory.

Figure 7:
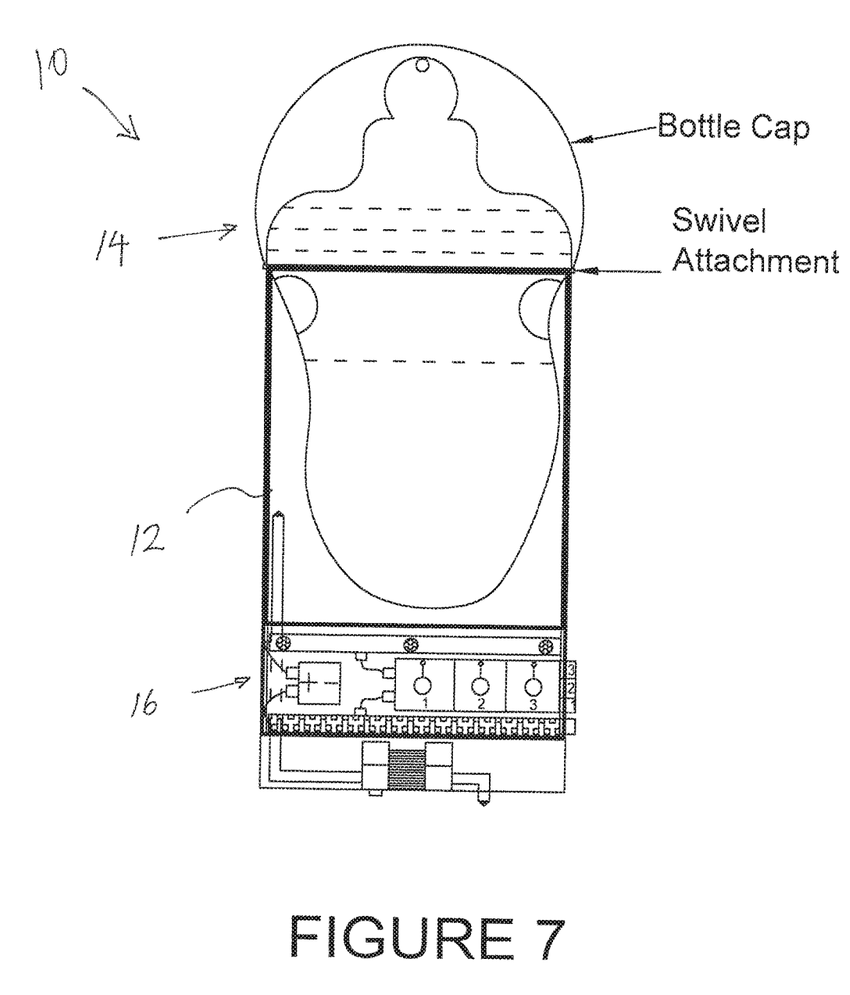
FIG. 7 is a front view of yet another illustrative embodiment of a smart bottle according of the present invention comprising a cap.

As shown in FIG. 7, additional features of the present invention comprise a bottle cap that encloses the top of the smart bottle 10. The cap may be configured to not only enclose the smart bottle 10, but also to act as a seal that protects the nipple 42 of the smart bottle 10 from the outside elements. The bottle cap may snap inside at least a portion of the smart bottle 10 to close. The bottle cap may also be provided with a swivel attachment that pivots and swivels the bottle cap out of the way when the smart bottle is being used to feed the child. The swivel attachment may be configured to hold, swivel, and pivot while staying attached to the smart bottle 10.

Figure 8:
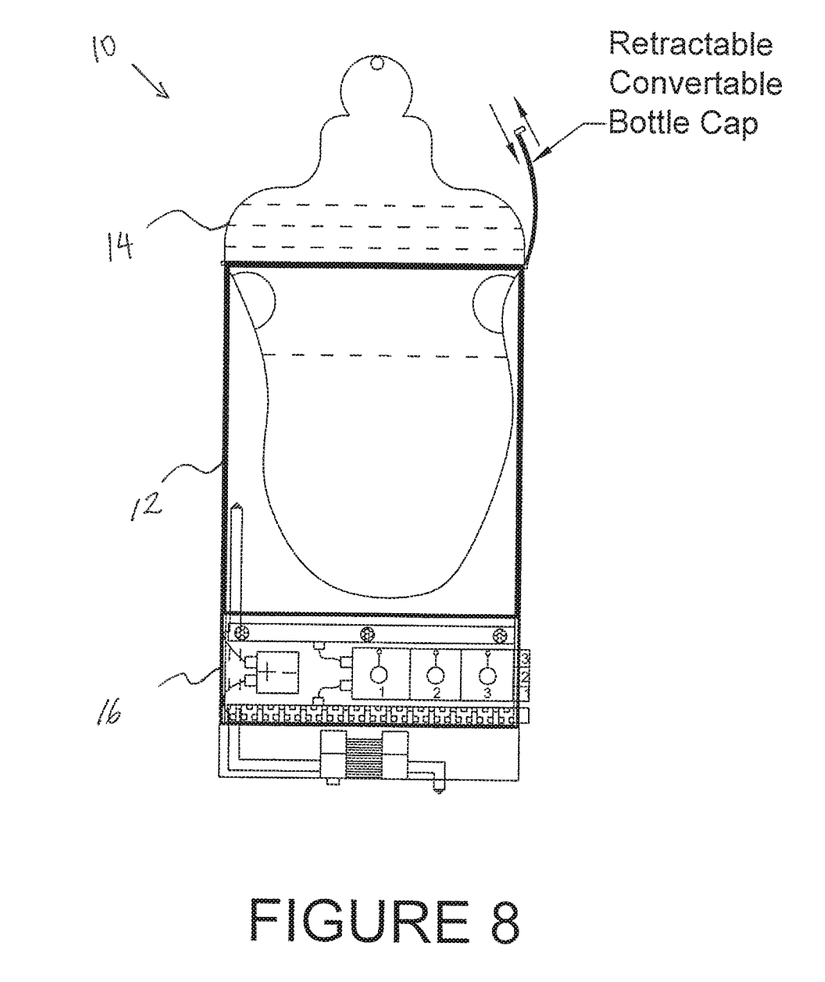
FIG. 8 is a front view of a further illustrative embodiment of a smart bottle according of the present invention comprising a retractable convertible cap.
Figure 9:
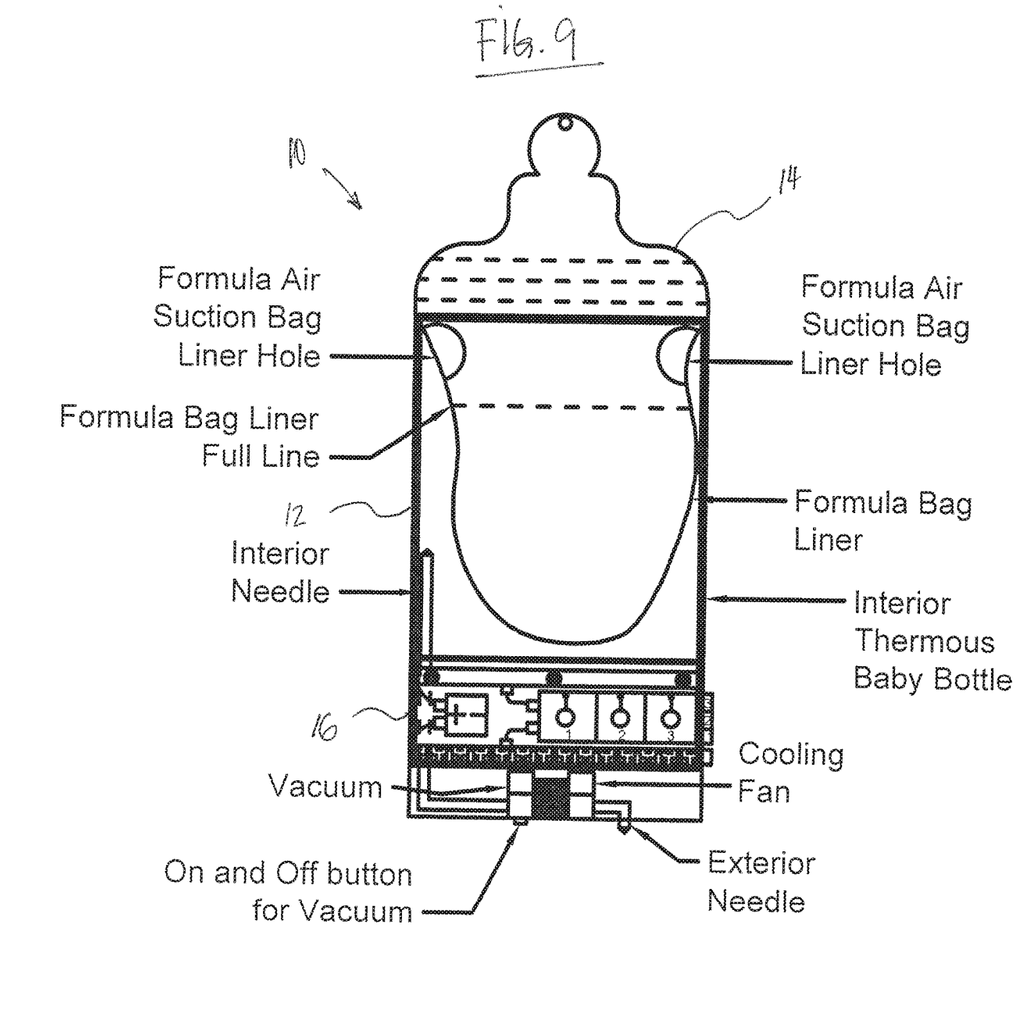
FIG. 9 is a front view of even another illustrative embodiment of a smart bottle according of the present invention.

As shown in FIG. 8, an even additional feature of the present invention comprise an alternative embodiment for the bottle cap. The bottle cap may be provided with a retractable convertible cap. The retractable convertible cap may be configured to retract and snap inside of the bottle exposing the nipple 42 of the smart bottle 10. The nipple 42 may be concealed by closing the retractable bottle, which may be enabled by pulling a knob and shutting it over the nipple 42. The retractable convertible bottle cap 10 may be opened by pushing a button on the side of the smart bottle 10.

The foregoing description of a preferred embodiment is provided for illustrative and exemplary purposes; those skilled in the art will appreciated that the present invention is not necessarily limited thereto. For instance, the smart bottle embodiment is described in connection with a nipple-type baby bottle. It will be appreciated that those smart features could be usefully integrated into other drink containers for babies and young children, such as "sippy" cups and straw cups.

With reference now to FIG. 10, additional features of the present invention comprise providing a smart bottle 10 configured to implement a learning scheme for babies and toddlers. In at least one embodiment, the smart bottle 10 may be provided with a processor 80 operatively configured with a sensor assembly 70 to implement a learning scheme according to the position of the smart bottle 10, including the position of the hollow body 12. As used herein, a "learning scheme" refers to a visual and/or audible pattern with instructional content for babies and infants, which may be reproduced visually or audibly, and which is designed to stimulate the babies and infants to learn instructional content. Examples of the instructional content include learning courses for numbers, important dates such as birthdays, and names of objects, animals, or people. Such instructional content may also comprise courses designed to teach mathematics to babies and toddlers. Such learning courses may be provided in one or more languages. The learning courses may comprise an option to quiz or otherwise test the baby's or the infant's progress and understanding of a particular lesson. Accordingly, it is within the scope of the present invention that the smart bottle may be provided with attendant hardware and/or software components to ascertain an audible response by the baby or infant to a specific question. A processor 80 may be operatively configured with a database of a learning course to determine whether a specific response is correct.

Another feature of the present invention comprises providing a smart bottle 10 configured to provide reward or reinforcement upon the baby or infant answering a question correctly. Examples of such rewards or reinforcement include certain celebratory lighting patterns, e.g., rapidly alternating color patterns, or an exciting melody or positive message reproduced audibly on the speakers 52. A positive message may also be reproduced visually. Likewise, the smart bottle 10 may be configured to correct the baby or infant upon providing an unsatisfactory response. For example, this may include a certain vibration pattern and/or sound pattern that would indicate to the baby or infant that the response was not satisfactory. More specifically, the processor 80 may be configured with vibrating components such that at least the base 16 may vibrate, for example upon the baby or infant providing an unsatisfactory response.

With reference to FIG. 10, even additional features of the present invention include a learning scheme for babies and infants that may be reproduced audibly and/or visually upon the occurrence of a predetermined condition as described herein. In at least one embodiment, the electronic function system 20 may comprise a lighting assembly 90 configured to display a lighting pattern. For example, the lighting assembly 90 may be configured to display various lighting patterns and/or colors, around base 16, cap 14, or hollow body 12. In other embodiments, the lighting assembly 90 may be configured to project a lighting pattern on a surface (e.g., ceiling surface and/or wall surface). The light pattern may be displayed and/or projected according to the position of the smart bottle 10, including the hollow body 12. For example, one lighting pattern may be displayed and/or projected according to an upright position of the smart bottle 10 and/or the hollow body 12. As a further example, another lighting pattern may be displayed and/or projected according to a substantially inclined or tilted position of the smart bottle 10 and/or the hollow body 12. The lighting pattern may comprise an instructional light pattern (e.g., letters, numbers, names, etc.).

As mentioned above, a learning scheme for babies and infants according to the present invention may also be reproduced audibly. In at least one embodiment, an electronic function system 20 comprising a sound interchanger system 28 and an audio system 30 may be configured to trigger a sound pattern. The sound pattern may comprise an instructional sound pattern according to the position of the smart bottle 10, including at least the hollow body 12. For example, one instructional sound pattern may be reproduced by the speakers 52 when the smart bottle 10 and/or hollow body 12 are disposed in a substantially upright position. Another sound pattern may be reproduced when the smart bottle 10 and/or hollow body 12 are disposed in a substantially inclined or tilted position, which may be indicative that the infant is drinking form the smart bottle 10.

As shown in FIG. 10, even additional features of the smart bottle 10 according to the present invention comprise providing an electronic function system 20 that is operatively configured with an external device 100 to selectively implement a learning scheme as defined herein. In one embodiment, a user (i.e., an adult, parent, family member, or custodian of the baby) may selectively trigger an instructional sound pattern, and/or an instructional lighting pattern. In at least one other embodiment, a user may use an external device 100 to monitor a learning progress of the baby or toddler. Accordingly, the processor 80 may be configured to interpret satisfactory and/or unsatisfactory responses of the infant, pursuant to a specific learning scheme. Such interpreted data of the responses may be stored, e.g., in an internal memory component of the electronic function system 20. Further, the processor 80 may be operatively configured with an external device 100 to share and/or display such interpreted data on the external device 100. In at least one embodiment, the interpreted data may be accessed via an electronic platform, i.e., a mobile application, or a web browser. Similarly, a user may access the electronic platform not only monitor the learning progress of the baby or toddler, but also to control implementation of a learning scheme and/or triggering of a lighting or sound pattern as described herein.

The foregoing is not an exhaustive listing of possible variations. Rather, those skilled in the art will appreciated that these and other modifications, as well as adaptations for particular circumstances, are possible within the scope of the invention herein shown and described, and of the appended claims.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A smart bottle configured to store a nutritional substance for babies and toddlers, the smart bottle comprising:
   a hollow body configured to retain the nutritional substance on an inside thereof,
   a base at least partially disposed on a bottom portion of said hollow body,
   an electronic function system disposed on an inside of said base, and
   said electronic function system comprising a sensor assembly and configured to implement a learning scheme for babies and toddlers, and a processor operatively configured with said sensor assembly to implement a learning scheme for a holder of said smart bottle according to a position of at least said hollow body;
   said learning scheme for the holder comprising images of instructional content configured to be reproduced visually,
   said instructional content configured to implement a quiz on the holder after completion of at least a portion of any given one of a plurality of learning courses;
   said electronic function system configured to ascertain a response from the holder to a specific question of said quiz;
   wherein said electronic function system further comprises a lighting assembly configured to project the instructional content comprising a light pattern of at least one of numbers, names of objects, names of animals, names of people, letters of alphabet, names of shapes, names of colors, words, mathematical problems, and words to songs, onto a projecting surface.

2. The smart bottle as recited in claim 1 wherein said learning scheme comprising a predetermined light pattern according to said position of at least said hollow body.

3. The smart bottle as recited in claim 2 wherein said predetermined light pattern comprises an instructional light pattern; said electronic function system operatively configured with an external device to selectively implement said instructional light pattern.

4. The smart bottle as recited in claim 1 wherein said electronic function system further comprises a sound interchanger system and an audio system operatively configured to trigger a sound pattern; said learning scheme comprising a predetermined sound pattern according to said position of at least said hollow body.

5. The smart bottle as recited in claim 4 wherein said predetermined sound pattern comprises an instructional sound pattern; said electronic function system operatively configured with an external device and said instructional sound pattern.

6. The smart bottle as recited in claim 4 wherein said electronic function system is operatively configured with an external device to selectively trigger an instructional sound pattern and monitor a learning progress of the baby or toddler.

7. A smart bottle configured to store a nutritional substance for babies and toddlers, the smart bottle comprising:
   a hollow body configured to retain the nutritional substance on an inside thereof,
   a base at least partially disposed on a bottom portion of said hollow body,
   an electronic function system disposed on an inside of said base,
   said electronic function system comprising a sensor assembly and configured to implement a learning scheme for babies and toddlers, and a processor operatively configured with said sensor assembly to implement a learning scheme for a holder of said smart bottle according to a position of at least said hollow body;
   said learning scheme for the holder comprising images of instructional content configured to be reproduced visually, and comprising a plurality of learning courses configured to teach to the holder at least one of numbers, names of objects, names of animals, names of people, the alphabet, names of shapes, names of colors, words, comprehension skills, mathematical problems, and words to songs;
   said instructional content configured to implement a quiz on the holder after completion of at least a portion of any given one of the plurality of learning courses;
   said electronic function system and said processor collectively configured to ascertain an audible response from the holder to a specific question of said quiz,
   said processor further configured to provide a reward to the holder upon ascertaining a correct answer by the holder; and
   wherein said electronic function system further comprises a lighting assembly configured to project the instructional content comprising a light pattern of at least one of numbers, names of objects, names of animals, names of people, letters of alphabet, names of shapes, names of colors, words, mathematical problems, and words to songs, onto a projecting surface.

* * * * *